United States Patent
Sampath et al.

(10) Patent No.: US 9,237,074 B1
(45) Date of Patent: Jan. 12, 2016

(54) DISTRIBUTED IDENTIFIER GENERATION SYSTEM

(71) Applicant: Amazon Technologies, Inc., Reno, NV (US)

(72) Inventors: Sudharsan Sampath, Chennai (IN); Vinoo Vasudevan, Chennai (IN); AndyGibb Halim, Redmond, WA (US); Pradipta Biswas, Kolkata (IN)

(73) Assignee: Amazon Technologies, Inc., Seattle, WA (US)

( * ) Notice: Subject to any disclaimer, the term of this patent is extended or adjusted under 35 U.S.C. 154(b) by 417 days.

(21) Appl. No.: 13/890,056

(22) Filed: May 8, 2013

(51) Int. Cl.
*H04L 12/24* (2006.01)

(52) U.S. Cl.
CPC ............. *H04L 41/50* (2013.01); *H04L 41/044* (2013.01); *H04L 41/12* (2013.01)

(58) Field of Classification Search
CPC .............................. H04L 41/12; H04L 41/044
See application file for complete search history.

(56) References Cited

U.S. PATENT DOCUMENTS

| | | | | |
|---|---|---|---|---|
| 6,415,322 B1* | 7/2002 | Jaye | ........................ | G06Q 30/02 379/127.01 |
| 2006/0248346 A1* | 11/2006 | Shiomi | ................. | H04L 9/0847 713/184 |
| 2011/0188378 A1* | 8/2011 | Collins | ................. | H04L 41/042 370/236 |
| 2012/0137010 A1* | 5/2012 | Diehl | .................. | H04L 63/1505 709/228 |
| 2012/0226787 A1* | 9/2012 | Ait-Ameur | ......... | H04L 61/2053 709/222 |
| 2015/0222435 A1* | 8/2015 | Lea | ..................... | H04L 63/0823 713/155 |

* cited by examiner

*Primary Examiner* — Larry Donaghue
(74) *Attorney, Agent, or Firm* — Lee & Hayes, PLLC

(57) ABSTRACT

Some examples provide for issuing identifiers to clients of a distributed identifier generation system. A request for a unique identifier may be received by a host. The host may generate an identifiers based at least in part on a host identifier issued to the generating host and a value of a counter operated by the generating host. The identifiers may be unique within the distributed identifier generation system.

27 Claims, 11 Drawing Sheets

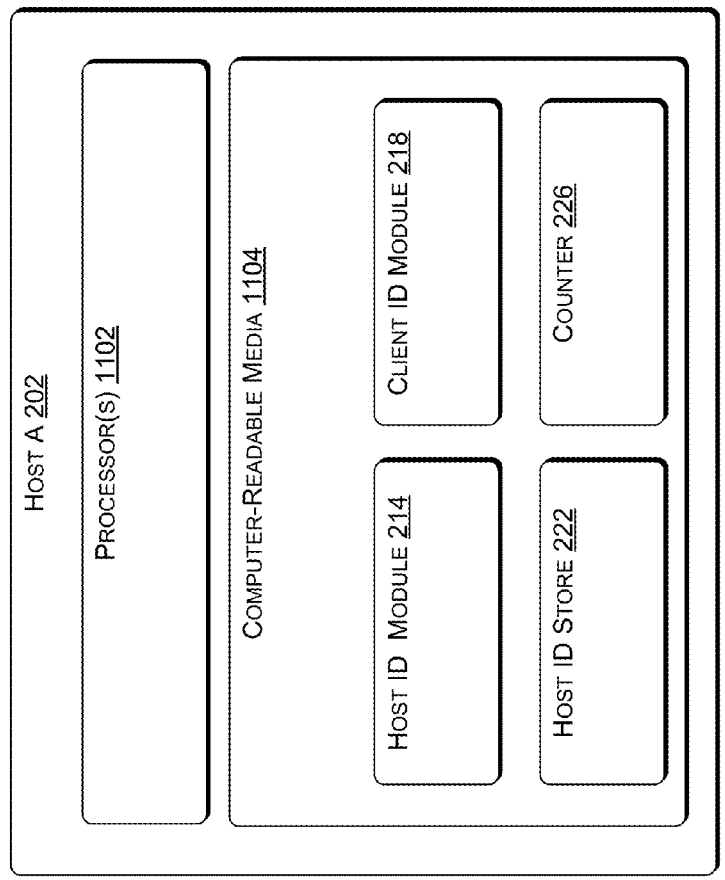

US 9,237,074 B1

DISTRIBUTED IDENTIFIER GENERATION SYSTEM

BACKGROUND

Identifier generation systems are utilized in many situations to generate a unique identifier (e.g., number, alphanumeric, letters, etc.). Such situations may include client identification generation, order or record identification generation, transaction identification generation, and many other scenarios in which a unique number or identifier is utilized. Conventionally, identifier generation systems are non-distributed or, if distributed, require internal interaction and coordination in order to function. For example, conventional identifier generation systems may utilize a sequential numeric identifier assignment system in which distributed systems may need to interact to ensure duplicate identifiers are not issued.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 11 is a schematic diagram of an illustrative computing architecture of an example host of a distributed identifier generation system.

DETAILED DESCRIPTION

Figure 1:
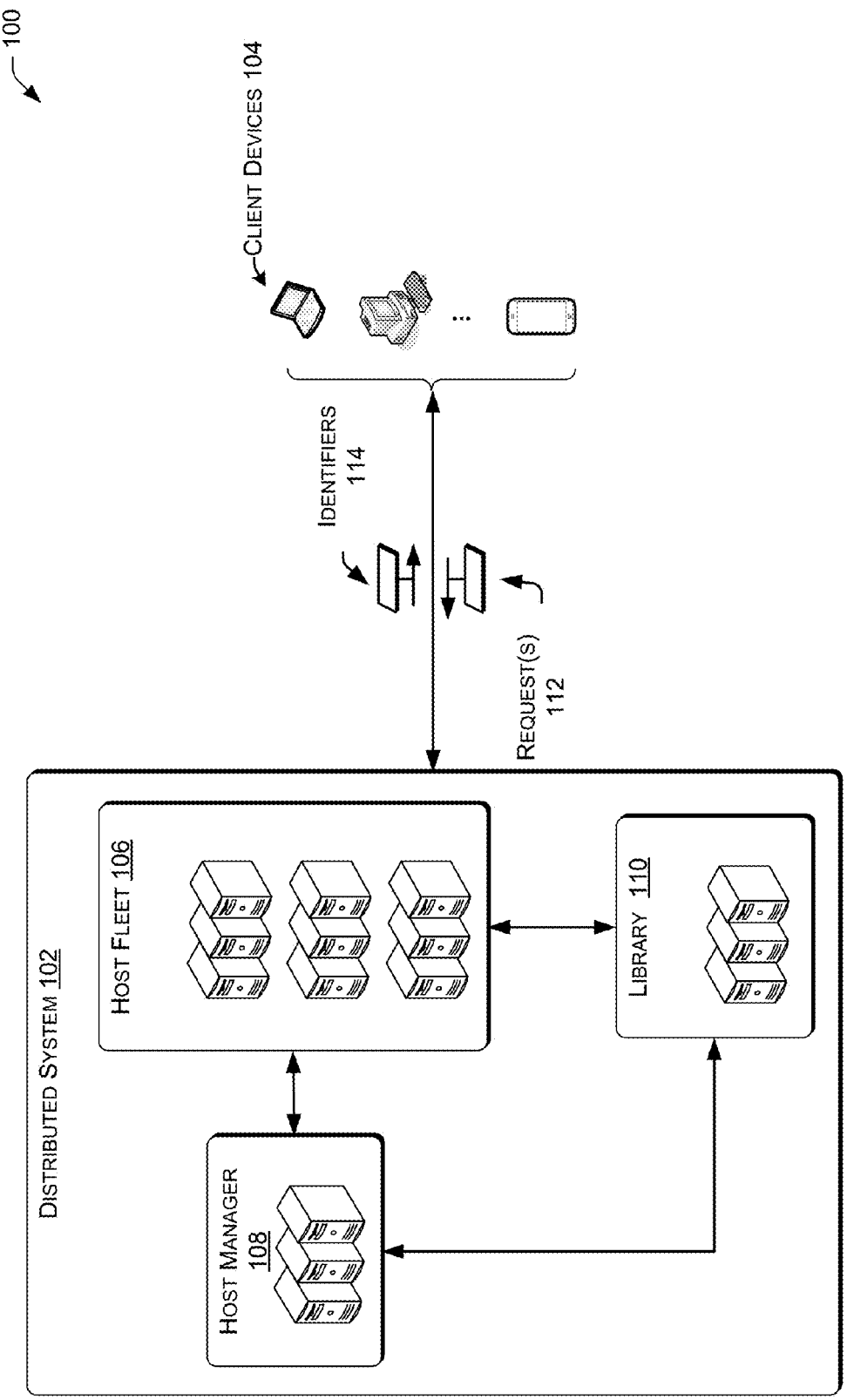
FIG. 1 shows an illustrative environment and system for providing a distributed identifier generation system that may provide identifiers to client devices of users of the distributed identifier generation system.

Implementations of the present disclosure may provide for the generation of identifiers with minimal interaction and/or coordination between, for example, host servers in a scalable distributed environment. In some implementations, a distributed identifier generation system is provided in which multiple host servers issue identifiers (IDs) to clients of the system. Prior to interacting with clients, the hosts may each request a unique host identifier (ID) from a host manager. In some implementations, the host manager of the system may maintain a counter and issue the host IDs sequentially using the counter. The host receives this unique host ID for subsequent use in issuing a unique identifier to a request client. Thus, when a client request for an identifier is received by a host, the host may issue an identifier to the client based on a concatenation of the host ID and a value of yet another counter maintained by the host. Because the host ID is unique to the host and the value of the counter is used once and then incremented, the concatenation of these two values is unique. Generating the identifiers in this manner allows for the hosts of the distributed system to operate with minimal interaction or coordination amongst one another.

For at least some implementations, the term "unique" is used herein with regard to identifiers, numbers, codes, and the like to signify that the unique item is issued once, or is otherwise unique within the system. As such, the designation of an item as unique herein does not limit the item to being unique in general. Further, some systems may be reset or reuse unique items based on some "reset" or reuse operation or procedure. For example, the items may expire or be retired, in which case the item may be reissued and yet remain unique within the system at any given time. In summary, the item may be "unique" in that the system may ensure that, based on some criteria, the item is uniquely issued or assigned within the system at a given time. Of course, the above variations on the usage of the term are not limiting and other such variations are possible.

In addition, as used herein, the terms "client ID" and "host ID" are not limited to identifiers specifically directed to identifying the client or host respectively. Rather, the terms are used herein to distinguish between identifiers, numbers, codes or the like, which are issued to and/or used by either the clients or the hosts. Thus, as used herein, host IDs are identifiers issued to the hosts and the client IDs are identifier issued to clients. However, as stated, an ID does not necessarily identify the entity to which the ID is issued. In a particular example implementation involving an e-commerce system, the client IDs issued to the clients may be utilized as identifiers for orders in an order data store.

Although implementations are described herein with reference to a server-client architecture, in which clients of the system request an identifier from a distributed system (or server), this is for ease of description only. Other architectures and technologies may be utilized without departing from the scope of the present disclosure. The techniques and systems described herein may be implemented in any number of ways. Example implementations are provided below with reference to the following figures.

FIG. 1 shows an environment and system 100 for providing a distributed identifier generation system 102 that may provide identifiers to client devices 104 of users of the distributed identifier generation system 102. The distributed system 102 generally refers to a network accessible platform implemented as a computing infrastructure of processors, storage, software, data access, and so forth that is maintained and accessible via a network such as the Internet. The distributed system 102 may not require end-user knowledge of the physical location and configuration of the system that delivers the services. Common expressions associated with distributed systems include "on-demand computing", "software as a service (SaaS)", "platform computing", "network accessible platform", and so forth. As shown in FIG. 1, the distributed system 102 includes a host fleet 106, a host manager 108 and a library 110. The host fleet 106, host manager 108 and library 110 may each include one or more network-accessible devices, such as servers or machines. The servers or machines may include one or more processors and computer-readable media. The servers or machines may be arranged in any number of ways, such as server farms, stacks, and the like that are commonly used in data centers.

As shown in FIG. 1, client devices 104 may operate to communicate with the distributed system 102 to obtain identifiers, such as unique numbers or codes. In some implementations, the client devices 104 may be end-user devices such as a personal computer, smartphone, tablet computer, laptop computer, netbook, or any other device capable of communicating with the distributed system 102. The client devices 104 may include one or more processors and computer-readable media. The processor(s) and the computer-readable media of the clients may be physically separate from the servers or machines of the distributed system 102. In other implementations, the client devices 104 may instead be a part of a larger system that includes both the distributed system 102 and client devices 104. For example, in an e-commerce system, the client devices 104 may be devices of an order processing system that interact with customers during a check out procedure. The order processing devices (client devices 104) may request identifiers from the distributed system 104 for use as identifiers of orders and other transactions with the customers.

In some implementations, the hosts of the host fleet 106 may receive request(s) 112 from the client devices 104 and provide the client devices 104 with identifiers 114 (such as unique identifiers, unique numbers or other unique codes). Identifiers may be generated based at least in part on a respective host ID and value of a counter of the particular host issuing the identifier (e.g. by concatenation). The host IDs may be provided to the hosts of the host fleet 106 by the host manager 108. The host manager 108 may generate the host IDs based at least in part on a value of a counter of the host manager 108. The host manager 108 may also update the library 110 by storing the relationship of the hosts to the respective issued host IDs. Similarly, the hosts of the host fleet 106 may store a relationship of the client devices 104 to the identifiers 114 issued to the respective client devices in the library 110.

In another particular example implementation, the distributed system 102 may include other functionality or be part of a larger system the client devices 104 communicate with. More particularly, the distributed system 102 may be a part of an e-commerce system with which the client devices 104 communicate. The client devices 104 may each request the distributed system 102 provide the client device 104 with a respective client identifier 114 for use in interacting with the e-commerce system.

The above description and particular examples provide a general outline of the operation of some implementations. However, other techniques may be employed to accomplish similar results. For example, though illustrated separately in FIG., the host manager 108 and library 110 could be combined in some implementations.

Figure 2:
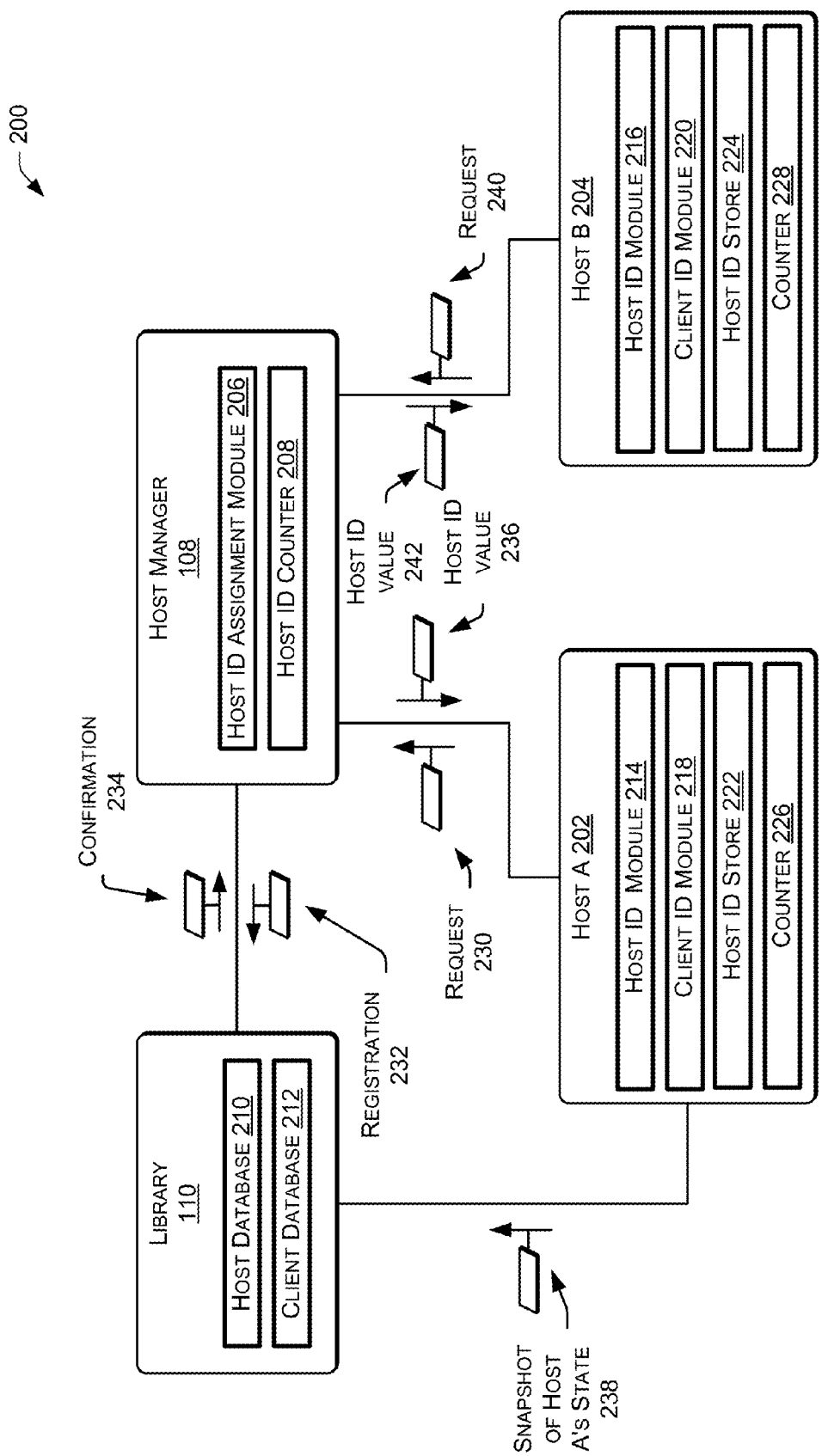
FIG. 2 shows an illustrative environment for providing host identifiers (IDs) to hosts in a distributed identifier generation system.

FIG. 2 shows an environment and system 200 that illustrates example operations of the environment and system 100 that in some implementations provide for the issuance of host IDs to hosts of the host fleet 106. In particular, FIG. 2 illustrates an example implementation in which host A 202 and host B 204 request host IDs from the host manager 108 for use in issuing identifiers to clients (e.g. client devices 104). As illustrated in FIG. 2, the host manager 108 includes a host ID assignment module 206 and a host ID counter 208. The library 110 includes a host database 210 and a client database 212. Host A 202 and host B 204 include host ID modules 214 and 216; client ID modules 218 and 220; host ID stores 222 and 224; and counters 226 and 228. Depending on the details of the particular implementation, the host manager 108, the library 110, the host A 202 and the host B 204 could each be implemented on a particular machine or computer or may be implemented in a distributed or portable manner. For example, in some implementations, the hosts may be implemented such that when a machine or computer operating the host crashes or is otherwise taken offline, the host may be executed on a different machine using a backup "snapshot" of the host's state taken prior to the crash and a "forward watermark." Additional details regarding such aspects of the system are discussed throughout this disclosure.

At initialization, host A 202 may not have an assigned host ID. As such, the host ID module 214 may generate a request 230 to be sent to the host manager 108. The request 230 indicates that host A 202 is requesting a host ID. Upon receiving the request 230, host ID assignment module 206 of the host manager 108 may determine the next unassigned host ID based at least in part on the value of the host ID counter 208. Although discussed herein in the context of the value of the host ID counter 208, implementations are not so limited and other techniques for generating the host ID values may be utilized.

In some implementations, the host ID assignment module 206 may send a registration request 232 to the library 110 that requests the library module 110 register the host A 202 using the next unassigned host ID. The library 110 may determine whether the host ID to be registered to host A 202 conflicts with, or duplicates a host ID previously assigned to a host of the host fleet.

For example, such a conflict could arise in the case of a distributed host manager 108 experiencing a concurrency failure. Specifically, in a system including multiple instances of host manager 108 issuing host IDs, a concurrency failure in the issuance of host IDs could result in the same host ID being generated for issuance twice. The library 110 may verify the no such conflict occurs.

If a conflict is found, the library 110 may report the conflict to the host manager 108. The host manager 108 may then increment the host ID counter 208 and issue a new registration request 232 based on the new value of the host ID counter 208. If the registration is successful, the library 110 may return a confirmation 234 that indicates that host A 202 has been successfully registered with the requested host ID in the host database 210. Upon receiving the confirmation 234, the host ID assignment module 206 of the host manager 108 may issue the host ID value 236 to the host A 202. The host manager 108 may then increment the host ID counter 208 to prepare for a subsequent host ID request.

In some implementations, upon receiving the host ID value 236, the host ID module 214 may store the host ID value 236 in the host ID store 222. Further, the host ID module 214 may store a snapshot of host A's state 238 in the host database 210 of the library 110. In some implementations, the snapshot of host A's state 238 may subsequently be loaded to allow host A 202 to recover from a failure, crash or planned shutdown. In other implementations, host A 202 may store the snapshot locally rather than at the library 110.

Subsequent to the issuance of the host ID value 236, the host manager 108 process a request 240 from host B 204. Request 240 may be processed in a similar fashion to request 230. Because the host ID counter 208 was previously incremented following the issuance of the host ID value 236 to host A 202, a different host ID value 242 will be generated, registered with the library 110 and returned to the host B 204. Further, though not shown in FIG. 2, host B 204 may also store a snapshot of host B's state locally or with the library 110.

Thus, host A 202 and host B 204 each acquire a host ID for use in issuing identifiers to client devices 104. The steps of issuing identifiers to client devices 104 will be discussed with regard to FIGS. 5-6.

The above described system and operations include but one illustrative system and technique for providing host IDs for use by hosts in issuing identifiers to clients. However, other techniques may be employed to accomplish similar results. For example, while the above described system and operations referred to the host IDs as identifiers, this is merely for ease of explanation. For example, the host may have set host identifiers and be issued values that are specifically used for generating client identifiers.

Figure 3:
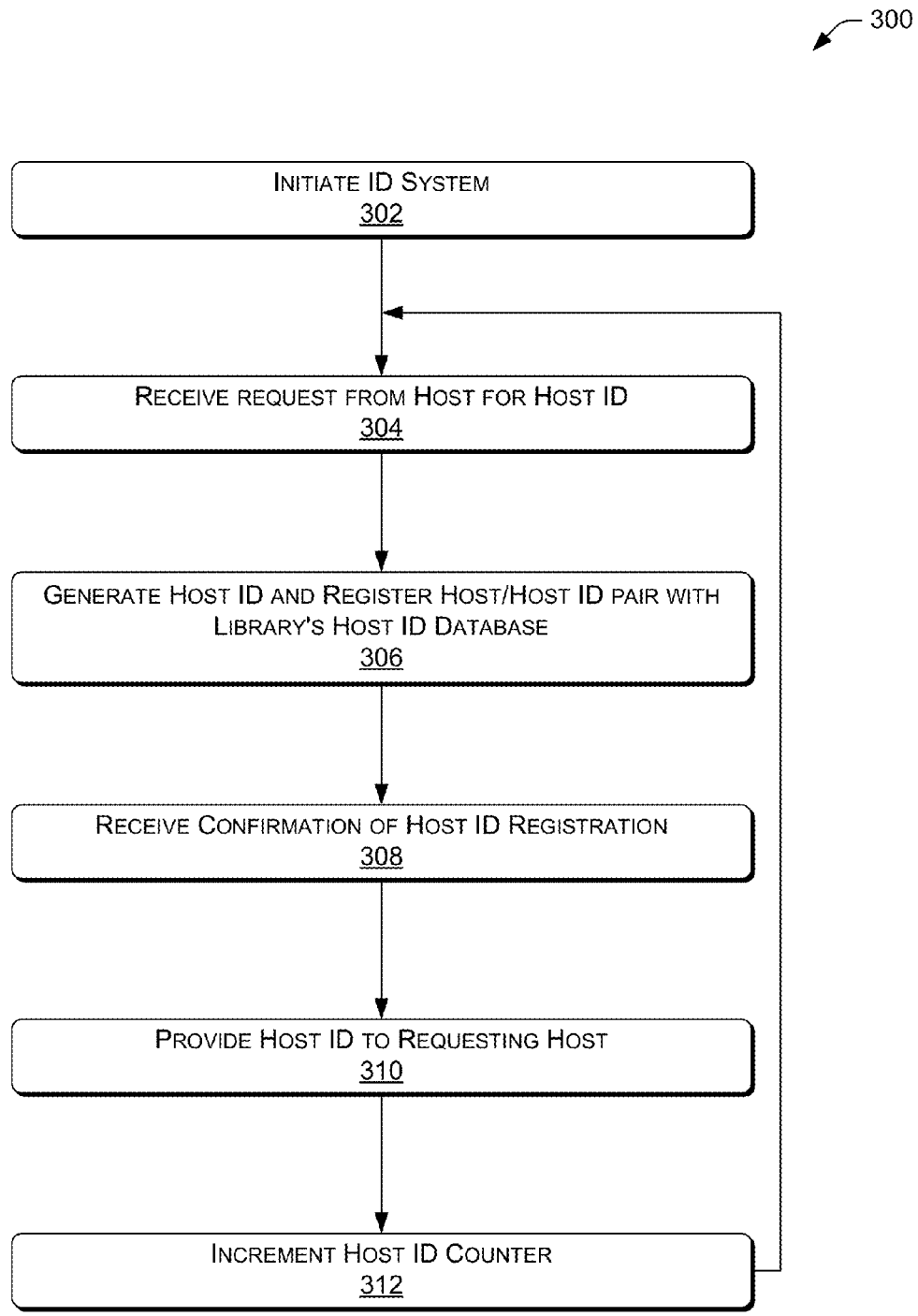
FIG. 3 shows an illustrative process for providing host IDs to hosts in a distributed identifier generation system.

FIG. 3 shows an illustrative process 300 for issuing host IDs (e.g. host ID values 236 and 242) to hosts in a distributed system. The process 300 is described with reference to FIGS. 1 and 2. The process 300 is illustrated as a collection of blocks in a logical flow graph, which represent a sequence of operations that can be implemented in hardware, software, or a combination thereof. In the context of software, the blocks represent computer-executable instructions that are executable by one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Also, one or more of the described blocks may be omitted without departing from the scope of the present disclosure. Other processes illustrated in the figures, such as in FIGS. 4 and 6-10, shall also be interpreted accordingly.

At 302, the distributed system 102 is initialized. For example, upon initialization, the host manager 108 may initialize the host ID counter 208 to zero or load a next unassigned host ID from the library 110.

At 304, the host manager 108 receives a request from a host for a host ID. At 306, the host ID assignment module 206 may utilize the value of the host ID counter 208 to generate a next unassigned host identifier. Based on the generated host identifier, the host manager may register the host/host identifier pair with the library's host database 210 in the manner discussed above with respect to FIG. 2. At 308, the host manager 108 receives a confirmation of registration of the host with the library's host database 210. At 310, the host manager 108 provides the host ID value to the requesting host. At 312, the host manager increments the host ID counter 208 and repeats the process beginning at 304 upon receipt of a request for another host ID.

The aforementioned discussion includes a set of illustrative techniques for issuing a host ID to a host in the distributed system 102. However, other techniques may be employed to accomplish similar results.

Figure 4:
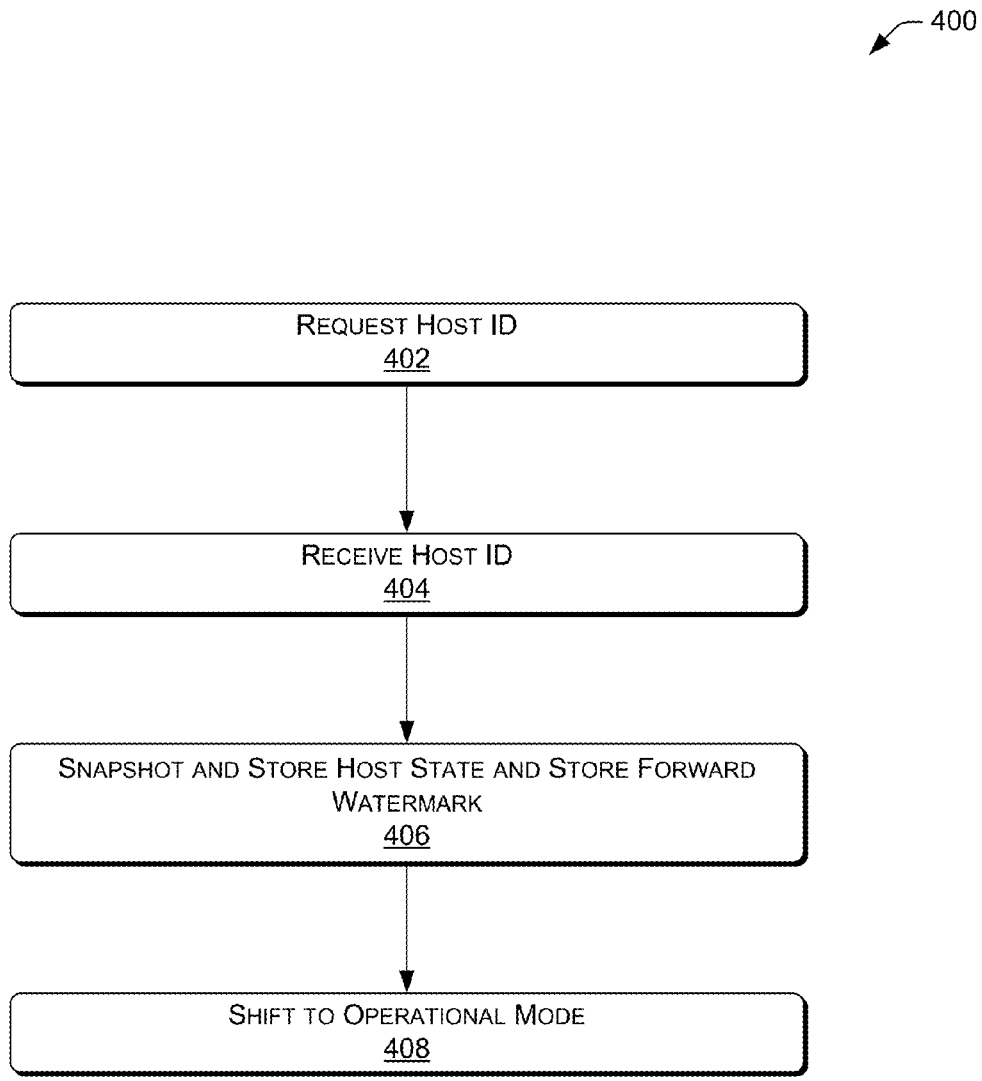
FIG. 4 shows an illustrative process by which a host may request a host ID in a distributed identifier generation system.

FIG. 4 shows an illustrative process 400 in which a host requests a host ID. As discussed above, the process 400 may be conducted upon initialization of a host. However, this process may also be conducted in other situations, such as upon recovery from a failure or when a host has exceeded a number of identifiers that can be generated based on an assigned host ID. The situation in which a host exceeds the number of IDs that can be generated based on an assigned host ID will be discussed in more depth below with regard to FIG. 5.

At 402, the host requests a host ID from the host manager 108. The host manager 108 may issue the host ID in the manner discussed above with regard to FIGS. 1-3. At 404, the host receives a host ID from the host manager 108 and stores the value. For example, host A 202 may store the received host ID value in the host ID store 222. At 406, the host may generate a snapshot of the host's state and store the snapshot locally or in the library 110.

Additionally, the host may store a forward watermark locally or in the library 110. In some implementations, a forward watermark may be determined and stored as a sum of the current value of the counter 226 and an offset value (e.g., forward watermark=current value+offset, where offset=100).

In some implementations, the host may use the forward watermark recover at least the host's counter (e.g., counter 226) to a value above the values already used to issue identifiers to clients following, for example, a crash. Thus, the forward watermark may be usable by the host to avoid a loss a large range or number of identifiers. Specifically, were a host to crash and lose the value of the counter 226, the host would be unable to determine the next unissued identifier with certainty. Thus, in an implementation that utilizes a concatenation of the host ID and a current value of the counter 226 as the identifier issued to clients, the host ID may be discarded and potential identifiers that may have otherwise been issued under the discarded host ID may be rendered unusable (i.e. these identifiers may not be issued to clients as the host will no longer be using the host ID from which these identifiers would have be generated). In some implementations, the lost range of identifiers may be significant. The maintaining of a forward watermark, periodically updated as the counter 226 approaches or reaches the forward watermark, may allow for the lost range of identifiers to be controlled. In other words, the largest range of identifiers that may be lost, assuming the forward watermark is not lost in the failure, is the offset value utilized in calculating the forward watermark (e.g., one hundred in the example given above).

On the other hand, in some implementations that do not include a forward watermark functionality, a host may instead discard its currently assigned host ID and request a new host ID upon recovering from a crash. As will be discussed in more detail below, some implementations that do not maintain a forward watermark may offset the risk of being forced to discard the host identifier in the event of a failure by minimizing the number of client level identifiers that may generated for each host identifier (in a relative sense, to the extent that all other factors and considerations of the system allow such minimization).

At 408, the host may shift into an operational mode in which identifiers are requested by clients and provided by the host. Additional details of the operation of the host are given below with respect to FIGS. 5-10.

The aforementioned techniques include a set of illustrative operations for requesting a host ID from a host manager and initializing a host in the distributed system 102. However, other techniques may be employed to accomplish similar results.

Figure 5:
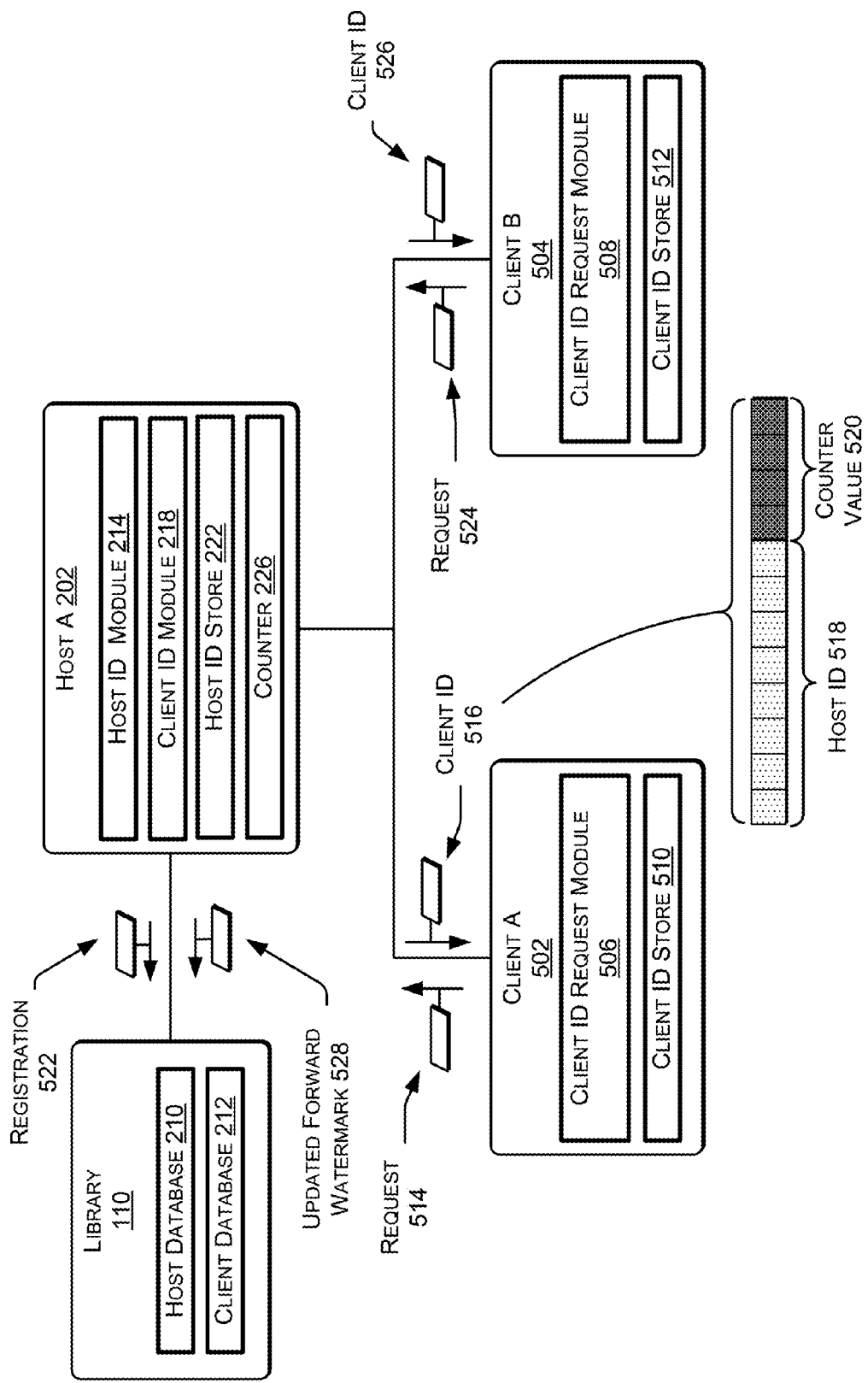
FIG. 5 shows an illustrative environment and a distributed identifier generation system that facilitates issuance of identifiers to clients.

FIG. 5 shows an environment and system 500 that illustrates example operations of the environment and system 100 that may provide for the issuance of identifiers to clients by a host (e.g. host A 202). In particular, FIG. 5 illustrates an example implementation in which host A 202 issues identifiers to clients. As illustrated in FIG. 5, the client A 502 and client B 504 include client ID request modules 506 and 508 and client ID stores 510 and 512. Depending on the details of the particular implementation, the client A 502 and client B 504 may be any type of device that may have need of identifiers, such as end user devices, server devices, other devices of the distributed system 102, etc. As discussed previously, in some implementations, the identifiers may be "unique"

within the context of the distributed system 102. Further, as discussed above, the identifiers may or may not "identify" the devices to which the identifiers are issued. For example, two possible uses of the identifiers may include the identifier identifying the clients or the identifiers may be used to identify transactions or orders in an e-commerce system.

In operation, when client A 502 is to register with or begin communicating with the distributed system 102, the client ID request module 506 of the client A 502 requests a client ID by submitting a request 514 to the host A 202.

Upon receiving the request 514, the client ID module 218 of the host A 202 may generate a client ID 516 based at least in part on the host ID 518 stored in the host ID store 222 and the current value 520 of the counter 226. As shown in FIG. 5, in some implementations, the client ID 516 may be the concatenation of the host's host ID 518 and the current value 520 of the counter 226. In particular, an illustration of a bitwise concatenation of the host ID 518 and counter value 520 is illustrated in FIG. 5. In the illustrated example shown in FIG. 5, the client ID 516 is a twelve bit number. Of the twelve bits, the highest eight bits include the host ID 518 and the lowest four bits include the counter value 522. Of course, the illustrated client ID 516 is merely an example and implementations are not so limited. Rather, depending on the details of a particular implementation, the number of bits, characters, numbers, symbols, etc. that make up the client ID 516 (and by extension the host IDs and counter width and usage) may vary.

Consider an example implementation of the distributed system 102 which issues 64-bit client IDs. In a system in which hosts are relatively stable and long lasting, a larger portion of the 64-bits may be derived from the value of the counter of the host. In other words, for each host ID, a relatively large number of client IDs may be generated. On the other hand, in a system in which hosts are relatively less stable or in which host states are bound to particular hardware, a relatively large portion of the 64-bits may be derived from the host IDs. Thus, the number of potential client IDs that may be lost due to a host ID being unusable for generating additional client IDs may be relatively small. Also, because the number of potential client IDs and may be generated for a given host ID is less, each host may be required to request replacement host IDs more often as the range of client IDs that may be generated for the host's particular host ID is exhausted.

In addition, in some implementations, the allocation of bits between the host ID portion and counter value portion of the identifier may be variable over time in the system. For example, some implementations may allow for the host ID portion of the client IDs to begin at the leftmost bit with additional bits being allocated to the host ID portion as the number of host IDs issued increases. Thus, when the fourth host ID is issued the portion allocated the host ID may increase from two bits to three bits. The counter value portion of the client ID may increase in width (number of bits) in a similar fashion. At a point where the total number of bits allocated to the host ID portion and counter value portion equals the number of bits available, some implementations may be adapted to expand the number of bits available for the client IDs.

Further, while discussed in the context of a concatenation of two values (i.e., the host's host ID 518 and the current value 520 of the host's counter), other additional operations may be performed to create the client IDs. For example, the value of the counter, rather than being used directly, may be input into an injective function or bijective function. An injective function is a function in which at most one input will provide each possible output. A bijective function is a function in which each possible output is provided by a single input that in turn provides only the output. Using either of these types of functions may ensure that the identifiers issued as client IDs remain unique in the context of the system but would allow for non-sequential issuance of the identifiers (in the case of numbers). Of course, the examples of injective and bijective functions are merely illustrative and are not to be considered an exhaustive list of functions that may be applied to the value of the counter. Further, some implementations may apply a function to the concatenation of the host ID and value of the counter, may apply a function to the host ID and value of the counter separately, may apply a function to the host ID only, apply a function to the value of the counter only, and so on. Moreover, some implementations may utilize functions that are substantially injective or bijective. In other words, the functions may be "good enough" such that the likelihood of two inputs receiving the same output is very small.

In another example variation, the client ID generation and, by extension, the host ID assignment may be performed using complex number representation. Some complex numbers may be represented as a+bi or as (r, theta), where r is the square root of $(a^2+b^2)$, tan(theta) is b/a. and i is the square root of negative one (−1).

In some such example implementations, the host IDs may be issued as unique theta values. These theta values may be real numbers in between 0 and 360 degrees or any other angle measurement. For example, in an implementation intended to have few hosts, the host IDs may be issued as theta values of 1, 2, 3 . . . 360 degrees. Similarly, in another implementation, the host IDs may be more densely packed, such as 0.01, 0.02, 0.03, . . . 360.00 (degrees).

In some implementations utilizing complex number representation, the host may first create a string utilizing "a," "b" and theta and then input the string to a hash generator function to obtain a value for use as the client ID. As theta values are unique across machines, the hashes are unique and, in turn, the client ID's are also unique.

In such an implementation, when a client ID is requested, a host may determine the string to be input to the hash function as follows. The host utilizes the host's theta value and "a" and "b" where "a" is a counter value and "b" is derived from the function tan(theta)=b/a. More particularly, "b" may be determined as the absolute value of a*tan(theta). As with previously discussed implementations, the incrementing of the counter value, "a" in this case, may be predefined and/or changeable. The string may be generated as a concatenation of the character representations of "a," "b" and theta.

The following is an example of pseudocode for the computation of a client ID utilizing complex number representation in the manner discussed above.

Sample pseudocode for client ID generation using complex number representation

1: double theta=30; //example value of theta assigned by host manager
2: double a=1.0; //example value of "a"
3: double t=Math.tan(theta); //determination of tan(theta)
4: double b=Math.abs(t*a); //b=a*tan(theta)
//Line 5 concatenates of the strings representations of "a," "b" and theta
5: String input=String.valueOf(a)+String.valueOf(b)+String.valueOf(theta);
//Lines 6-8 obtain a hash of the input value using a UUID function
6: MessageDigest md=MessageDigest.getInstance ('MD5');
7: byte[ ] output=md.digest(input.getBytes( ));

8: String uuid=UUID.nameUUIDFromBytes(output) .toString( );

With regard to the above discussions, other techniques or variations may be employed to accomplish similar results. Moreover, as mentioned previously, the identifiers are not limited to numbers and may comprise of any combination of letters, numbers, symbols, etc.

Once the client ID 516 has been generated, the client ID module 218 of the host A 202 may issue the client ID 516 to the client A 502. Upon receiving the client ID 516, the client ID request module 506 of the client A 502 may store the client ID 516 in the client ID store 510. The client A 502 may then proceed to use the client ID 516 in accordance with the particular implementation. For example, in a scenario in which the client ID 516 is to be used to identify the client 502 to the distributed system 102, the client A 502 may proceed to interact with the distributed system 102 using the client ID 516 as its identifier. However, as discussed above, in other implementations, the client ID 516 may be utilized in different manners.

After providing the client ID 516 to the client A 502, the client ID module 218 may issue a registration request 522 to the library 110 to register the client A 502/client ID 516 pair. As each host is utilizing its host ID 518 to generate client identifiers, the client ID module 218 may not be required to await confirmation from the library 110 of the validity of the registration. Specifically, because the client ID module 218 of host A 202 is utilizing host A's 202 own host ID 518 and counter 226, the distributed system 102 may not need to check for conflicts in the assignment of client identifiers.

Once processing with regard to the client ID 516 is complete, the client ID module 218 may update counter 226. For example, the client ID module 218 may cause the counter 226 to increment. The client ID module 218 of host A 202 may then determine whether the value of the counter 226 is approaching the forward watermark previously stored in the library 110. At this point in this discussion, it will be assumed that the forward watermark is still sufficiently offset from the current counter value to not require an update.

As such, the client ID module 218 of host A 202 may proceed to process a request 524 from the client B 504 for another client ID. The request 524 may be processed in a similar manner as that described above with regard to request 514. As a result, the client ID 526 is issued to the client B 504 and is in turn stored in the client ID store 512. The client ID module 218 of host A 202 then increments the counter 226. The client ID module 218 may then determine if the value of the counter 226 is approaching or has reached the value of the forward watermark previously stored in library 110. If so, the client ID module 218 may determine an updated forward watermark 528 (e.g., in the manner previously discussed of adding an offset value to the current value of the counter 226). The client ID module 218 may then provide the updated forward watermark 524 to the library 110 to be stored as a replacement for the previous forward watermark.

In addition to determining whether the forward watermark should be updated, the client ID module 218 may also determine if the counter 226 is approaching or has exceeded a maximum value. As discussed above, in some implementations, once the maximum value of the counter is reached, further client IDs cannot be generated based on the current host ID. Thus, for example, if the counter 226 has exceeded its maximum value (e.g. the counter 226 may overflow and reset to zero), the client ID module 218 may request that the host ID module 214 obtain a new host ID for the host A 202. The new host ID may be obtained in the manner discussed above with regard to FIGS. 2-4. Once the new host ID has been obtained and stored in the host ID store 222, the counter 226 may be reset, if needed. Thereafter, the client ID module 218 may begin fulfilling requests for client IDs using the new host ID.

Figure 6:
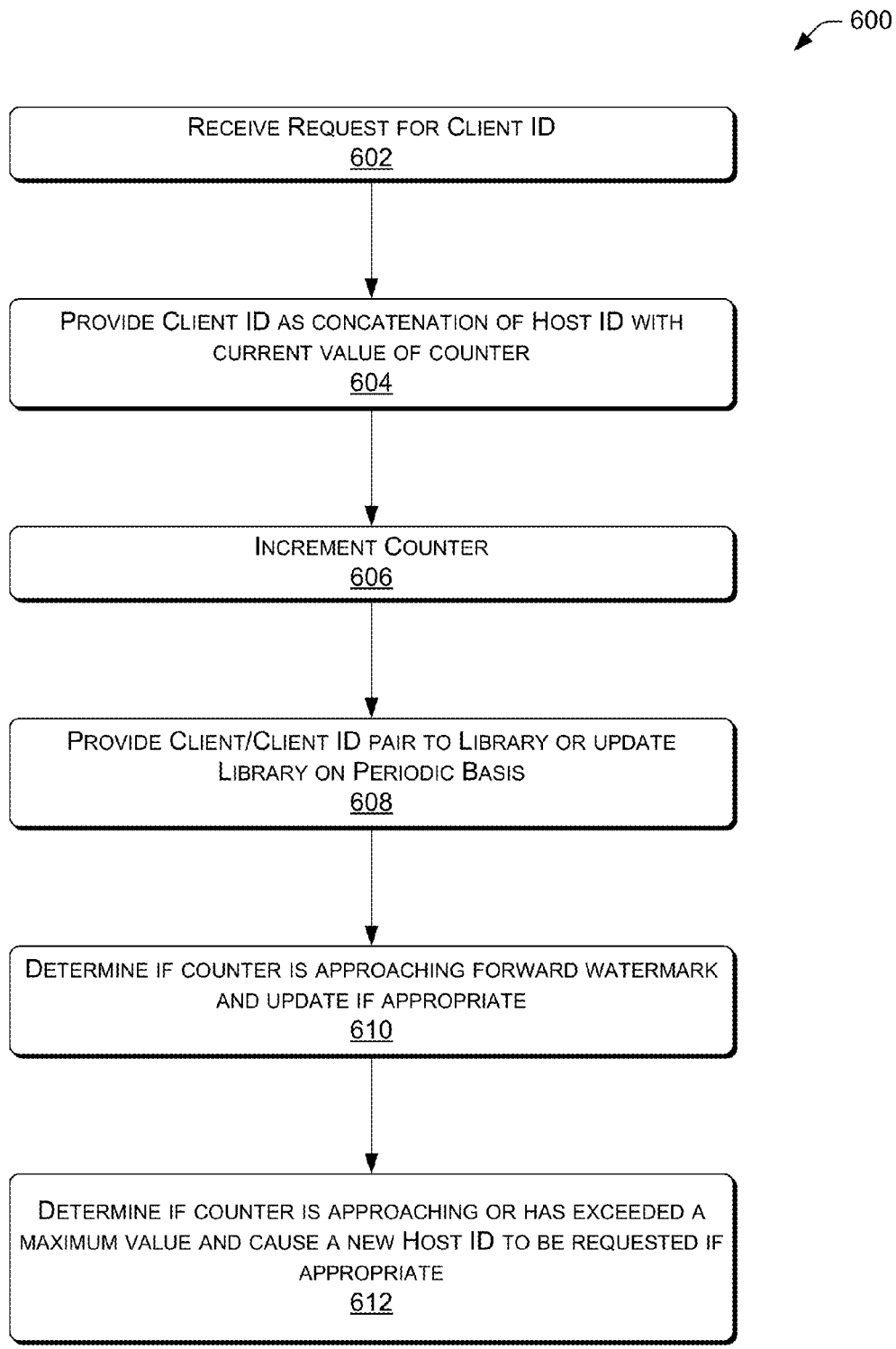
FIG. 6 shows an illustrative process for providing identifiers to clients in a distributed identifier generation system.

FIG. 6 shows an illustrative process 500 for providing identifiers to clients of the distributed system. The process 500 is described with reference to the preceding figures, and specifically with reference to FIG. 5.

At 602, the host A 202 receives a request for client ID. At 604, the client ID module 218 may determine the client ID as a concatenation of the host ID of the host A 202 and a current value of the counter 226. The client ID is then provided to the requesting client. At 606, the client ID module 218 instructs the counter to increment.

At 608, the client ID may be provided to the library 110 along with an identification of the requesting client to register the requesting client/client ID pair in the library 110. Alternatively, in some implementations, the update of the library 110 based on the client IDs may be performed on a periodic basis rather than at the time each client ID is issued. In other implementations, the update of the library may be performed as an interaction between the client and the library 110 rather than the host and the library.

At 610, the client ID module 218 may determine if the counter 226 is approaching the forward watermark value. If so, the client ID module 218 may determine a new forward watermark value and update the library 110 based on the new forward watermark value.

At 612, the client ID module 218 may determine if the counter is approaching or has exceeded a maximum value. As discussed above, in some implementations once the maximum value has been reached or exceeded, additional client IDs cannot be issued based on the current host ID. Accordingly, the client ID module 218 may cause the host ID module 214 to request a new host ID.

The aforementioned techniques include a set of illustrative operations for a host in the distributed system 102 to issue identifiers to client devices 104. However, other techniques may be employed to accomplish similar results. Further, as mentioned above, process 600 shown in FIG. 6 is illustrative and as such, process 600, or portions thereof, such as the tracking and/or storage of client ID to client relationships, may not be performed by some implementations.

Figure 7:
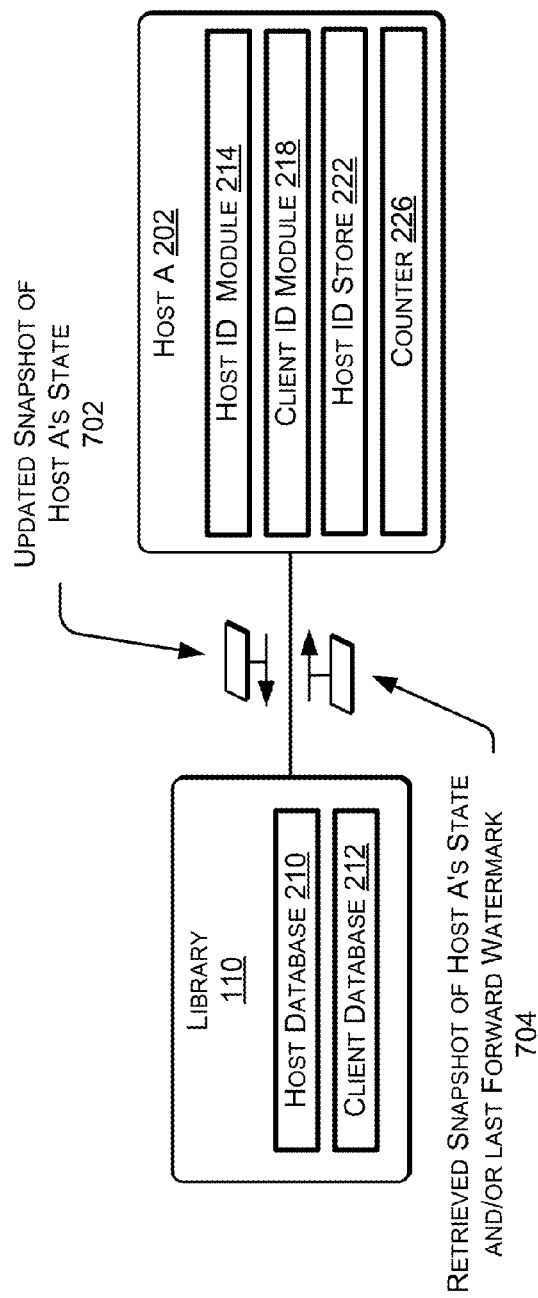
FIG. 7 shows an illustrative environment and system that may be used to update a snapshot of a host's state at shutdown.

FIG. 7 shows an environment and system 700 that illustrates example operations of the environment and system 100 that may provide for the updating of a snapshot of a host's state at shutdown. System 700 may also provide for utilizing the host's snapshot and/or forward watermark to restart the host after a shutdown or failure in some implementations.

As illustrated in FIG. 7, when a shutdown command is issued to host A 202 by, for example, a user or other machine, the host ID module 214 may generate an updated snapshot of host A's state 702. The updated snapshot of host A's state 702 is then stored in the library 110 (e.g., in the host database 210). In some implementations, this may include setting the forward watermark to the current value of the counter 226 or the forward watermark may be discarded entirely upon storage of the updated snapshot 702. Host A 202 may then complete its shutdown.

At a subsequent time, host A 202 may be restarted or otherwise instructed to resume operations. After the start-up has been initiated, host A 202 may request that the library 110 provide the snapshot of host A's state 702 stored in the library 110. As mentioned above, if the host A 202 was not properly shut down (e.g., if host A 202 is coming back online after crashing), host A may further request the library provide host A's forward watermark. Host A 202 may then utilize the snapshot to recover its state at the time of a shutdown. In the case of recovering from a crash or other failure in which the snapshot was not updated, host A may recover to a state determined based on the last snapshot and the forward watermark. Thus, the recovery of host A's state may be performed such that a duplicative issuance of client IDs does not occur.

Figure 8:
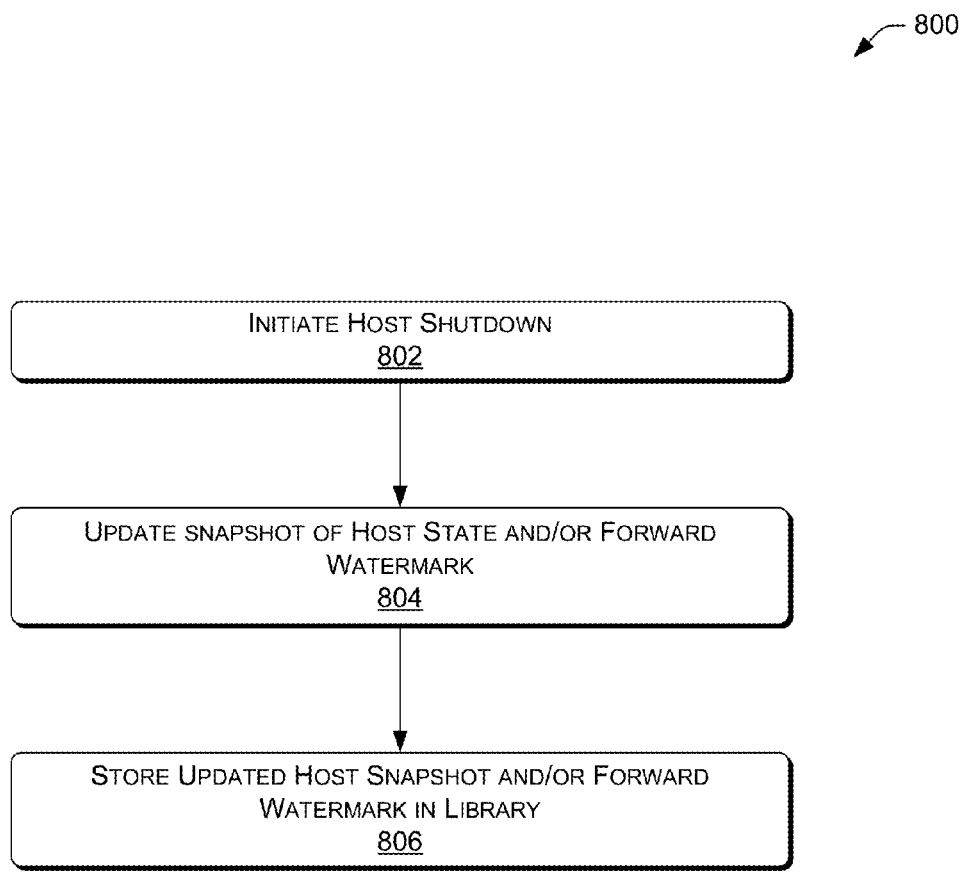
FIG. 8 shows an illustrative process for handling a shutdown of a host in a distributed identifier generation system.

FIG. 8 shows an illustrative process 800 for handling a shutdown of a host in the distributed system 102 according to some implementations. The process 800 is described with reference to the preceding figures, and specifically with reference to FIG. 7.

At 802, a shutdown of the host is initiated. As mentioned previously, the shutdown may be initiated by a user, another device of the distributed system 102, etc. At 804, the host ID module of the host operates to generate an updated snapshot of the host's state and, depending on the implementation, update the forward watermark of the host. The host ID module of the host then operates to cause the updated snapshot and/or forward watermark to be stored in the library or locally, depending on the implementation.

Figure 9:
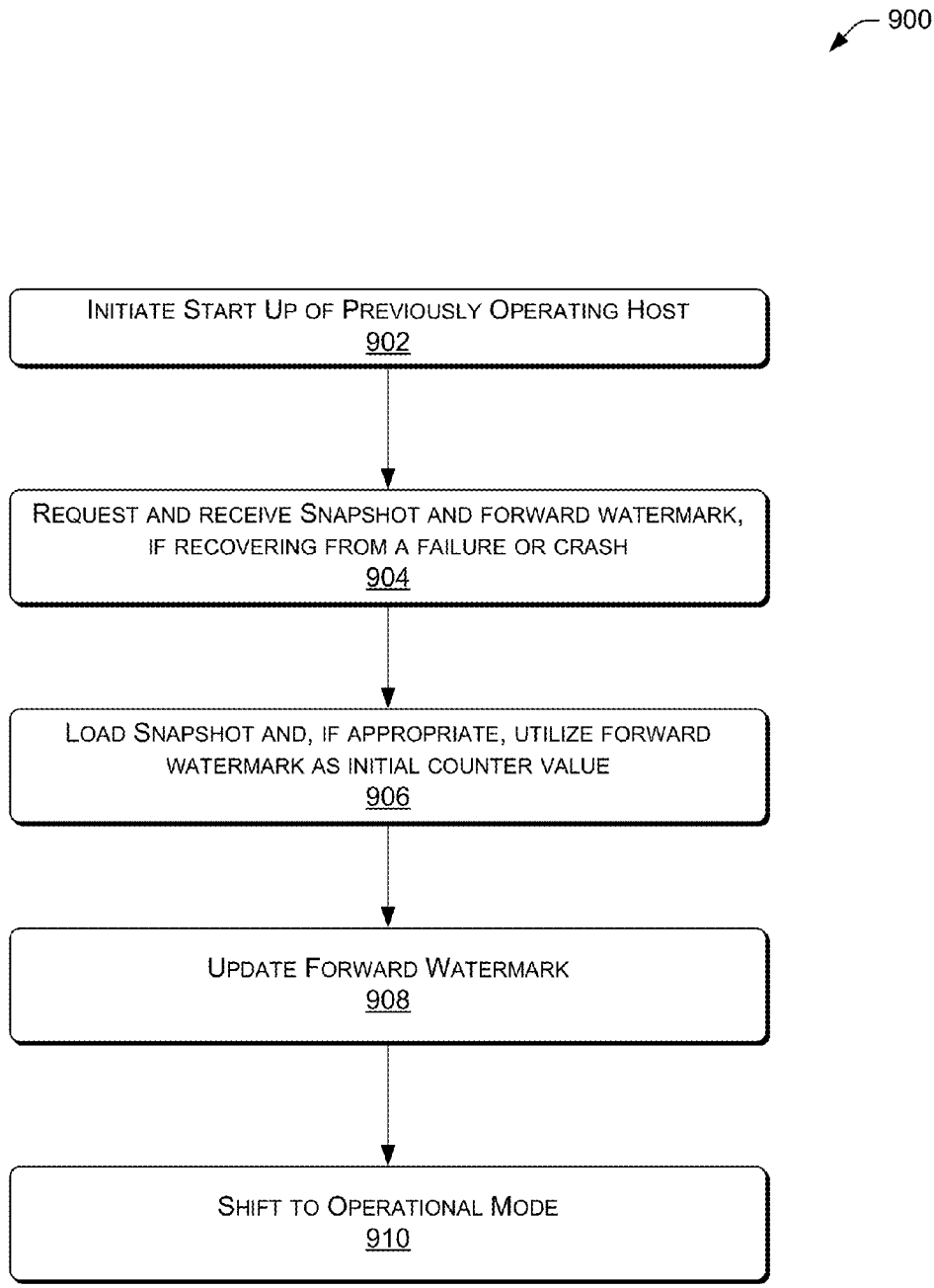
FIG. 9 shows an illustrative process for handling an initialization of a previously operating host in a distributed identifier generation system.

FIG. 9 shows an illustrative process 900 for handling an initialization of a previously operating host following, for example, being properly shut down, crashing or other experiencing a failure. The process 900 is described with reference to the preceding figures, and specifically with reference to FIG. 7.

At 902, the start up of the previously operating host is initiated. The startup may be initiated by a user or may be performed automatically based on, for example, a processing load being handled by the distributed system 102.

At 904, the host ID module of the host may request that the library 110 provide the snapshot of the host's state stored in the library 110. As mentioned above, if the host was not properly shut down (e.g., if the host A 202 is coming back online after crashing), the host ID module may further request the library 110 provide the host's forward watermark. In response, the library may send the snapshot and/or forward watermark to the host.

At 906, the host may load the snapshot and, if appropriate, utilize the forward watermark as the initial value of the host's counter. As discussed previously, the use of the forward watermark as the initial value the host counter may be appropriate when recovering from a crash or other failure. Specifically, when recovering from a crash or other failure, the host may not be able to guarantee that a client ID was not issued after the most recent snapshot of the host's state was generated. However, as the host operates to update the forward watermark when the host's counter approaches or reaches the forward watermark value, the host can guarantee that no client ID was issued based on a value of the counter greater than the forward watermark.

At 908, the host may operate to update the forward watermark to a new value in a similar fashion to that discussed above with respect FIG. 5. At 910, the host, having now recovered its previous state (or its previous state offset to the forward watermark), shifts to an operational mode to begin fulfilling client requests for identifiers.

The aforementioned system and techniques include a set of illustrative operations for a host in the distributed system 102 to shut down and then recover from a shutdown or from failure without the need to discard the host's current host ID. However, other techniques may be employed to accomplish similar results.

Figure 10:
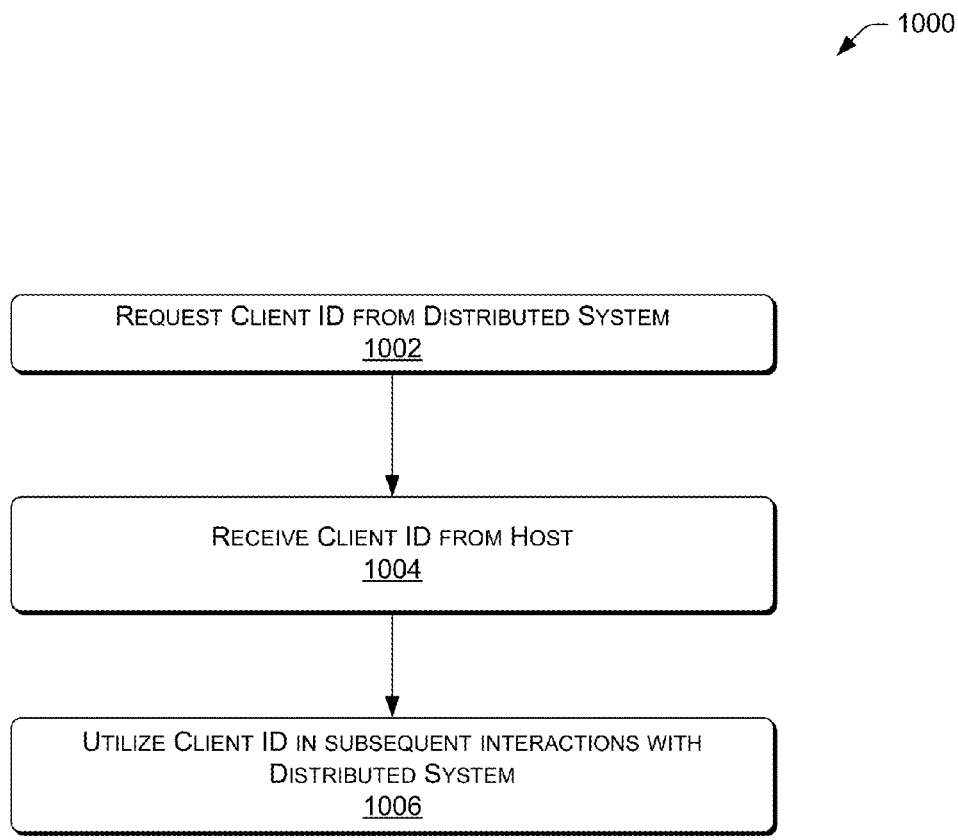
FIG. 10 shows an illustrative process for a client to request a client identifier in a distributed identifier generation system.

FIG. 10 shows an illustrative process 1000 for requesting, by a client, a client ID from the distributed system 102. The process 1000 is described with reference to the preceding figures, and specifically with reference to FIG. 5.

At 1002, the client ID request module issues a request to the distributed system 102 for a client ID. The request for the client ID may be handled by the distributed system in the manner discussed above with regard to FIGS. 1-9. At 1004, the client receives the client ID from the host. At 1006, the client begins to utilize the client ID, for example, in interactions with the distributed system 102.

The aforementioned techniques include a set of illustrative operations by which a client device may request and utilize an identifier in the environment and system 100. However, other techniques may be employed to accomplish similar results. For example, while 1006 is shown in the context of utilizing the client ID for interactions with the distributed system 102 from which the client ID was obtained, implementations are not so limited and the client may instead utilize the client ID for communication with another system or for some other purpose entirely.

FIG. 11 is a schematic diagram of an illustrative computing architecture 1100 of an example host A 202 that may provide the functionality described herein with respect to FIGS. 1-10. The computing architecture 1100 may be implemented in a distributed or non-distributed computing environment.

Host A 202 may include one or more processors 1102 and one or more computer readable media 1104 that store various modules, applications, programs, or other data. The computer-readable media 1104 may include instructions that, when executed by the one or more processors 1102, cause the processors to perform the operations described herein for the distributed system 102. In some implementations, the computer-readable media 1104 may include the host ID module 214, client ID module 218, the host ID store 222 and the counter 226, which are described above in detail. The components may be stored together or in a distributed arrangement.

Implementations may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, implementations may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

Though not shown, the host manager 108, library 110, clients 502 and 504, etc. may comprise similar components to those of host A 202 illustrated in FIG. 11. These and other variations of the specific form taken by the hosts 202-204, host manager 108, library 110, clients 502-504 and so on would be apparent to one of ordinary skill in the art in view of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A distributed computing system comprising:
one or more processors;
one or more computer-readable storage media storing computer-executable instructions;
a plurality of host modules maintained in the one or more computer-readable storage media;
a host manager module maintained in the one or more computer-readable storage media and executed by the one or more processors to issue host identifiers to the plurality of host modules, the host identifiers being unique within the distributed computing system; and
the plurality of host modules executed by the one or more processors to:
generate, by a generating host module of the plurality of host modules, unique identifiers to be issued to requesting clients, the unique identifiers being generated based at least in part on a host identifier issued to the generating host module by the host manager and a value of a counter operated by the generating host module, the unique identifiers being unique within the distributed computing system; and
issue the unique identifiers to requesting clients;
a library module maintained in the one or more computer-readable storage media and executed by the one or more processors to:
store the host identifiers of the plurality of host modules;
receive a registration request from the host manager module;
based at least in part on the registration request, determine whether a first host identifier to be registered to a first host is unique within the distributed computing system;
in the event the first host identifier is unique within the distributed computing system, allow the registration of the first host identifier to the first host based on the registration request,
in the event the host identifier is not unique within the distributed computing system, deny the registration of the first host identifier to the first host based on a registration request.

2. The distributed computing system of claim 1, wherein the host identifiers are issued based at least in part on a value of a host identifier counter of the host manager.

3. The distributed computing system of claim 1, wherein each value of the counter of the generating host module is uniquely utilized in the generating unique identifiers based on the respective host identifier of the generating host.

4. The distributed computing system of claim 1, wherein the host module is further operative to generate a snapshot of the state of the host and provide the snapshot to the library upon receiving a host identifier.

5. A method comprising:
under control of one or more computing devices configured with computer executable instructions,
requesting, by instructions executing on a host of a plurality of hosts of a distributed identifier generation system, a host identifier that is unique to the host within the distributed identifier generation system;
receiving the host identifier based at least in part on the request; and
generating an identifier to be provided to a client of the distributed identifier generation system based at least in part on the received host identifier of the host.

6. The method of claim 5, wherein the identifier to be provided to the client of the distributed identifier generation system is further based at least in part on a first value generated by the host and used by the host only during the generation of the identifier to be provided to the client of the distributed identifier generation system and not during the generation of other identifiers based on the same received host identifier.

7. The method of claim 6, wherein the first value is based on a value of a counter operated by the host.

8. The method of claim 6, wherein the identifier to be provided to the client of the distributed identifier generation system is generated by concatenating a value based at least in part on the host identifier and the first value.

9. The method of claim 5, wherein the identifier to be provided to the client of the distributed identifier generation system is further based at least in part on a value of a counter of the host;
the method further comprising:
determining a forward watermark value based on the value of the counter of the host and an offset; and
storing the forward watermark value.

10. The method of claim 9, further comprising:
determining that the counter of the host has met a threshold with regard to the forward watermark value;
based on the determination that the counter of the host has met the threshold with regard to the forward watermark value, determining an updated forward watermark value based on the value of the counter of the host; and
storing the updated forward watermark value.

11. The method of claim 9, further comprising:
upon recovery from a failure in which the value of the counter of the host is non-recoverable or not usable, utilizing the stored forward watermark value as the value the counter and resuming operation of the host based at least in part on the value of the counter.

12. The method of claim 5, further comprising:
storing the identifier to be provided to the client of the distributed identifier generation system and an identification of the client in a library of the distributed identifier generation system.

13. The method of claim 5, wherein the identifier to be provided to the client of the distributed identifier generation system is further based at least in part on a value of a counter of the host; and
the method further comprising:
receiving a shutdown instruction at the host;
generating a snapshot of the state of the host; and
storing the snapshot of the state of the host.

14. The method of claim 13, further comprising:
during a start up process of the host subsequent to a shutdown:
determining that a snapshot of the state of the host was previously stored; and
utilizing the snapshot to recover the state of the host prior to the shutdown including recovering the host identifier of the host and the value of the counter of the host at the time of the shutdown; and
subsequent to the start up process, issuing a different identifier to another client based on the recovered host identifier and the recovered value of the counter of the host at the time of the shutdown.

15. The method of claim 5, wherein the identifier to be provided to the client of the distributed identifier generation system is further based at least in part on a value of a counter of the host; and
the method further comprising:

determining whether the counter of the host has reached or exceeded a threshold with respect to a maximum value; and if the host has reached or exceeded the threshold with respect to the maximum value, requesting a new host identifier that is unique to the host within the distributed identifier generation system.

16. The method of claim 5, wherein the identifier to be provided to the client of the distributed identifier generation system is utilized as at least one of:

an identifier of the client in interactions with a system associated with the distributed identifier generation system;

an identifier of an order in an electronic commerce system; or an identifier of a transaction in an electronic commerce system.

17. One or more computer-readable media storing computer-executable instructions executable by one or more processors to cause the one or more processors to perform operations of a host manager of a distributed identifier generation system, the operations comprising:

generating host identifiers that are unique among hosts to which the host identifiers are issued; and issuing the host identifiers to the hosts such that the hosts utilize the host identifiers to generate identifiers to be issued to clients of the distributed identifier generation system.

18. The one or more computer-readable media of claim 17, wherein the instructions are further executable to perform operations comprising:

receiving an indication that one or more identifiers issued by the distributed identifier generation system are invalid; and determining, based at least in part on one or more host identifiers issued to hosts of the distributed identifier generation system and the one or more invalid identifiers, one or more hosts that issued the one or more invalid identifiers.

19. The one or more computer-readable media of claim 17, further comprising:

requesting that a library of the distributed identifier generation system register a first host identifier to a first host;

in an event the registration of the first host identifier is successful, issuing the first host identifier to the first host.

20. The one or more computer-readable media of claim 19, further comprising, in an event the library rejects the registration of the first host identifier to the first host:

incrementing a host identifier counter of the host manager;

generating a second host identifier based on a new value of the host identifier counter; and requesting that the library of the distributed identifier generation system register the second host identifier to the first host.

21. One or more computer-readable media storing computer-executable instructions executable by one or more processors to cause the one or more processors to perform operations of a host of a distributed identifier generation system, the operations comprising:

requesting, by the host, a host identifier that is unique to the host among hosts of the distributed identifier generation system;

receiving the host identifier based at least in part on the request; and generating an identifier to be provided to a client of the distributed identifier generation system based at least in part on the received host identifier of the host in such a way that identifiers generated using other host identifiers will be different.

22. The one or more computer-readable media of claim 21, wherein the identifier to be provided to the client of the distributed identifier generation system is further based at least in part on a first value generated by the host, the first value not being used during the generation of other identifiers based on the same received host identifier.

23. The one or more computer-readable media of claim 22, wherein the first value is based on a value of a counter operated by the host.

24. The one or more computer-readable media of claim 22, wherein the identifier to be provided to the client of the distributed identifier generation system is generated by concatenating a value based at least in part on the host identifier and the first value.

25. The one or more computer-readable media of claim 21, wherein the identifier is one or more of:

a code;

a number; or a string of letters, numbers, and other symbols.

26. The one or more computer-readable media of claim 21, wherein the host identifier is a theta value and the generating the identifier to be provided to the client of the distributed identifier generation system is based at least in part on a trigonometric function of the theta value.

27. The one or more computer-readable media of claim 26, wherein the trigonometric function is a tangent function.

* * * * *